United States Patent [19]

Noyes et al.

[11] 4,352,829

[45] Oct. 5, 1982

[54] COFFEE EXTRACTION PROCESS

[75] Inventors: Robert M. Noyes; Roger W. Voeller, both of Cincinnati, Ohio

[73] Assignee: The Procter & Gamble Company, Cincinnati, Ohio

[21] Appl. No.: 240,731

[22] Filed: Mar. 5, 1981

[51] Int. Cl.³ ............................ A23F 5/22; A23F 5/26
[52] U.S. Cl. .................................... 426/387; 426/386; 426/388; 426/424; 426/432
[58] Field of Search ............... 426/387, 386, 424, 432, 426/388

[56] References Cited

U.S. PATENT DOCUMENTS

| | | | |
|---|---|---|---|
| 2,562,206 | 7/1951 | Nutting | 426/386 |
| 2,802,739 | 8/1957 | Nutting | 426/386 |
| 3,132,947 | 5/1964 | Mahlmann | 426/386 |
| 3,148,070 | 9/1964 | Mishkin et al. | 426/386 |
| 3,615,665 | 10/1971 | White et al. | 426/386 X |
| 3,644,123 | 2/1972 | Pitchon | 426/432 |

FOREIGN PATENT DOCUMENTS 865488 2/1978 Belgium .
1057840 2/1967 United Kingdom .

OTHER PUBLICATIONS

Sivetz Coffee Processing Technology, vol. 2, 1963, Avis Westport, Conn., pp. 43–45, 78–83, 157–160, 241–243.

Primary Examiner—Joseph M. Golian
Attorney, Agent, or Firm—Rose Ann Dabek; Julius P. Filcik; Richard C. Witte

[57] ABSTRACT

A process for forming a coffee extract particularly suitable for preparing a soluble decaffeinated coffee is disclosed. Roast and ground coffee is charged to a series of extraction columns. Certain columns are pressurized with steam (50 to 250 psig) for about 5 to about 45 minutes to increase the acidity of the coffee. The remaining roast and ground coffee is not steamed. Each of the coffees is separately extracted, preferably in a countercurrent fashion. The extract from the steamed columns is kept separate from the extract from the unsteamed columns. The extract from the steamed column has a pH of below 4.6, while the extract from the unsteamed columns has a pH of about 5.0. The extract from the unsteamed coffee is stripped with steam to form a flavor volatile condensate. Both coffee extracts are then combined, decaffeinated, and concentrated. Concentration of the combined extracts removes off-flavor volatiles which are present in the steamed extract. The flavor volatile condensate collected from the unsteamed coffee extract is added back to the concentrated combined extract. The concentrated extract can then be dried in a conventional manner to produce a soluble coffee product.

11 Claims, 1 Drawing Figure

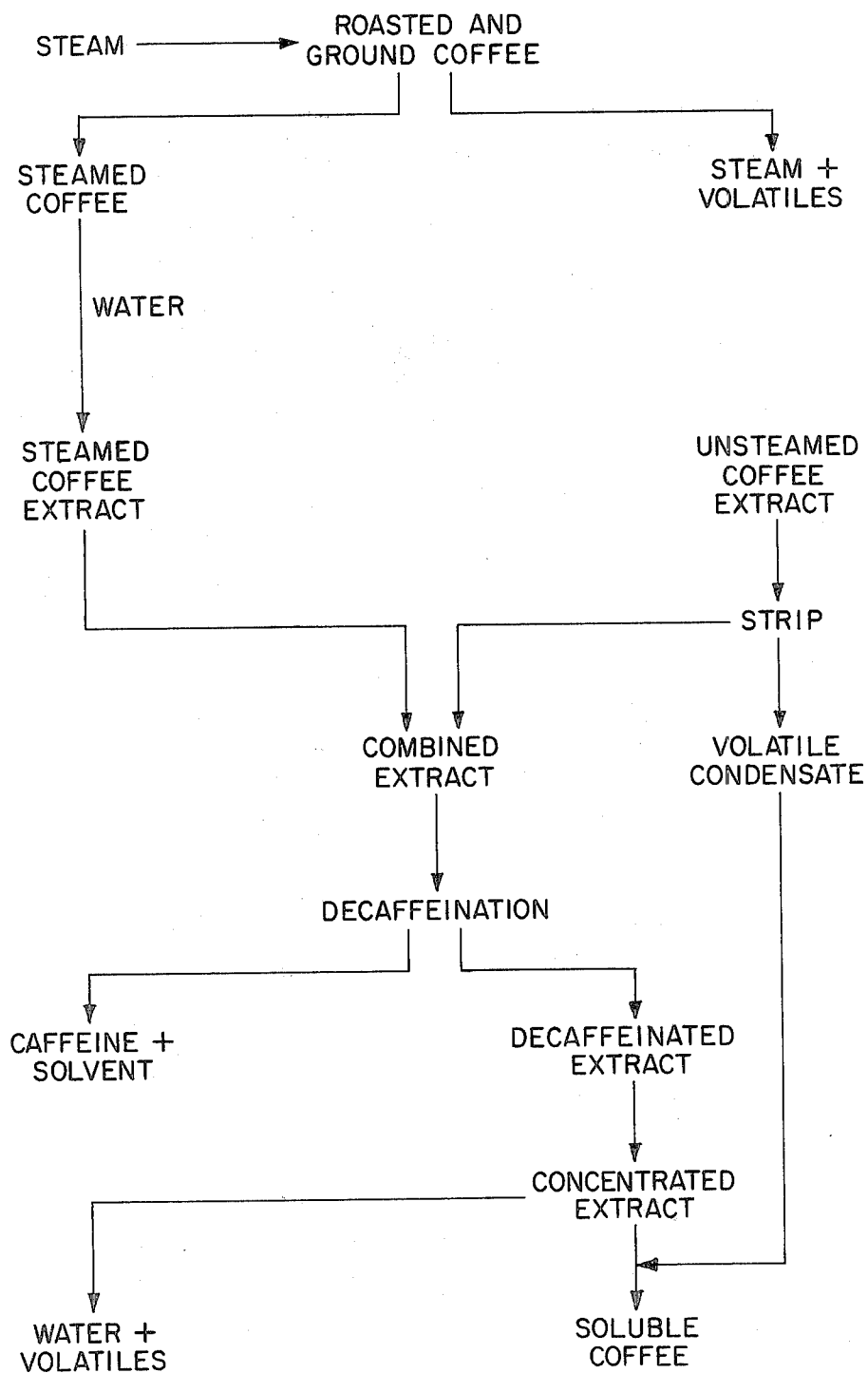

COFFEE EXTRACTION PROCESS

TECHNICAL FIELD

This invention relates to a process for forming a coffee extract from roast and ground coffee having a pH of about 4.7. This coffee extract can be dried to produce a soluble coffee, concentrated to produce a coffee concentrate, and can be decaffeinated to produce a decaffeinated coffee concentrate or decaffeinated powder.

BACKGROUND OF PRIOR ART

There are many techniques for producing roast and ground coffee extracts which can be concentrated, decaffeinated and/or dried to produce soluble or instant coffee. In order to make the process economically feasible, the yield of coffee solubles from the roast and ground coffee must be high. In order to match the aroma and flavor volatiles which are present in roast and ground coffee, a number of techniques have been used for stripping these volatiles from the roast and ground coffee before and after extraction.

Many of these processes involve steam distillation of the volatile aromatics from the roast and ground coffee. These distillates are condensed and added back to the coffee at some point. It is well known to those skilled in the art that the extract obtained via extraction of steamed coffee is undesirably acidic. Steaming roasted and ground coffee is thought to result in the production of undesirable acids which degrade the quality of coffee extract obtained when extracting the steamed roasted and ground coffees.

Many techniques have been devised for minimizing the production of acids or in some way masking the flavor or aroma of these acids. When the extract produced is to be decaffeinated in a liquid/liquid decaffeination process, this problem becomes even more acute. This is readily apparent since the organic solvents which extract the caffeine from the coffee extract also extract some of the important coffee solubles making the presence of undesirable acids even more apparent to the consumer.

See, for example, U.S. Pat. No. 3,644,123, issued to Pitchon in 1972, in which he notes that by steaming the roast and ground coffee to remove the volatiles and then extracting the coffee, an extract is formed which is undesirably acidic. The pH is about 4.7 due to the increase of "undesirable acids" formed during the steaming operation. Pitchon has found that the pH of the extract can be increased by flowing the extract from the steamed coffee through a bed of unsteamed coffee.

Similarly, U.S. Pat. No. 3,148,070, issued to Mishkin et al. in 1964, also discloses that in order to improve the extract obtained from coffee which has been steam-distilled to strip the aromatic volatiles that the stripped coffee be extracted together with non-steamed coffee in a well known manner. British Pat. No. 1,057,840, published in 1967, also discusses steaming of roast and ground coffee to form a distillate. The steamed coffee is then extracted together with an equal quantity of unsteamed coffee. A portion of this extract is optionally concentrated and freeze-dried in combination with the steam distillate. The remaining portion of the extract is spray-dried and combined with freeze-dried material.

These references and other references in the art teach the desirability of steaming roast and ground coffee to remove flavor and aroma volatiles for later addback to coffee extract. They also teach that this steaming develops undesirable acids which must be subsequently removed or neutralized by co-extraction of an unsteamed coffee.

Surprisingly, it has been found that decaffeination of green beans followed by roasting and conventional extraction produces certain acids in the soluble coffee made therefrom which lend a desirable taste to the final brew. The special steaming process described herein produces these acids within the roast and ground coffee along with undesirable volatile materials. It is an object therefore of this invention to produce a coffee extract having a pH of about 4.7 which contains desirable acids.

It is also an object of the present invention to make a unique coffee extract in which an extract produced from steamed coffee is mixed with an extract produced from unsteamed coffee. When these extracts are decaffeinated in a liquid/liquid process and then concentrated, the undesirable volatiles from the steamed portion are removed. The desirable acids produced during the steaming process contribute a flavor strength to the concentrate.

These and other objects will become apparent from the specification herein.

BRIEF DESCRIPTION OF THE DRAWINGS

FIG. 1 represents a schematic of the process for handling the steamed and unsteamed extracts through decaffeination, concentration and coffee solubles formation.

DETAILED DESCRIPTION OF THE INVENTION

The present invention relates to a method for preparing a coffee extract which has a unique flavor strength. This coffee extract when decaffeinated in a liquid/liquid extract process, produces a decaffeinated coffee extract which is very flavorful.

An acidic coffee extract is prepared by:
(a) steaming coffee at a pressure of from about 50 to about 250 psig for from about 5 to about 45 minutes to provide steamed coffee capable of forming an extract having a pH of less than about 4.6;
(b) forming an extract from the steamed coffee of step (a); and
(c) removing the off-flavor volatiles from the extract of step (b).

The high temperature steaming of the coffee forms off-flavor volatiles which are vented and not collected. Some off-flavor volatiles remain in the extract and therefore must be removed. This is conveniently done during the concentration of the extract. This steamed extract can be mixed with an unsteamed extract to produce a unique flavored coffee extract.

A unique decaffeinated coffee extract is formed by the following process comprising these steps:
(a) forming an extract having a pH of less than about 4.6 from coffee steamed at from about 50 to about 250 psig for from about 5 to about 45 minutes;
(b) forming an extract having a pH of less than about 5.0 from unsteamed coffee;
(c) distilling volatile flavor components from the extract of step (b);
(d) combining the extracts of steps (a) and (c);
(e) decaffeinating the combined extracts;
(f) concentrating the decaffeinated extract to a solids content of about 35% to about 65%; and (g) adding the distilled volatiles of step (c) to the concentrated extract to step (f).

The pH of the coffee extracts is determined by measuring the pH of a 1.33% solids solution. The solids content of the coffee extract is measured, then the sample is diluted to form a 1.33% solids solution. A standardized pH meter is used to measure the pH.

By "coffee" herein is meant roasted and ground coffee. Any class of coffee may be used, i.e. Arabicas, Robustas, Milds, Brazils, or blends thereof. The coffee is roasted and ground in a conventional manner.

The degree of roasting and the fineness of the grind will depend upon the desired flavor and the type of extraction column used. Those skilled in the art will readily recognize the types and grinds of coffees which may be used herein.

By "unsteamed coffee" is meant roast and ground coffee which has not been subjected to the steam treatment hereinafter described.

By "steamed coffee" herein, is meant coffee which has been subjected to steam at pressures of from about 50 to about 250 psig, preferably from about 120 to about 170 psig for a period of from about 5 to about 45 minutes, preferably from about 10 to about 15 minutes. Most preferably, the steaming will be at 130 to 150 psig for from about 10 to about 15 minutes. The temperatures of the steaming will range from about 295° F. to about 405° F.

After the steaming, the extraction column containing the steamed roast and ground coffee is vented and the steamed distillate is not collected.

For convenience, the steaming of the roast and ground coffee is done when the coffee has been charged to a column in a conventional coffee extraction train. The steamed coffee is extracted with water by conventional means, preferably in a countercurrent fashion, to produce a coffee extract. The extract from the fresh steamed columns is collected separately.

Unsteamed coffee is also charged to extraction columns of a coffee extraction train. The unsteamed coffee is extracted in a conventional manner, preferably in a countercurrent manner. The extract from the non-steamed columns is kept separate from the steamed coffee extract.

The non-steamed coffee extract is devolatilized in a conventional manner. Preferably, the unsteamed extract is stripped with steam to remove the coffee volatiles. Steam is passed through a column containing the extract under the following conditions: 0.05 to 0.2 lb. steam/lb. of extract at a vacuum of from 10 to 28 inches of Hg. This coffee volatiles condensate is separated and preserved for later addition to the concentrated extract. This steam stripping captures important volatiles which would be lost in the further processing.

The two extracts are then combined, i.e. the unsteamed extract from which the volatiles have been removed is mixed with the steamed coffee extract. The acidity of the final extract can be precisely controlled by selecting the number of columns which are steamed versus the number of columns which are unsteamed, as well as by the steaming conditions. In other words, the steaming conditions of time and pressure are used to control the acidity of the steamed extract, and the ratio of steamed to unsteamed coffee extract can be used to control the acidity of the combined extracts. Preferably a one to one mixture of the extracts is used.

The unique feature of the steaming process is the formation of a steamed extract having a pH below 4.6, on average, with a solids concentration in the range of a conventional coffee extract, i.e., 12% to 25% solids. Moreover, the titratable acidity (milliequivalents of sodium hydroxide per gram of coffee solids) of this extract is about 7. The same coffee which has not been treated to a steaming process, i.e. unsteamed coffee, extracted in the similar manner produces a solids concentration within the same range, however the pH is about 4.9 and the titratable acidity about 5. The higher titratable acidity means that it takes more titrant (sodium hydroxide) to reach a pH of seven for the steamed extract than for the unsteamed extract. This is indicative of the concentration of the acids within the coffee extract. Thus, the steamed coffee extract has more organic acids than the unsteamed extract.

This change in pH and titratable acidity is taken as being indicative that desirable acids have been formed within the coffee extract via the unique steaming process. It has also been discovered that undesirable off-flavors are also developed during the steaming which are not lost in the venting step. These off-flavors however are removed during the concentration step as noted above after the steamed and non-steamed extracts are combined and/or decaffeinated. A conventional devolatilization process can also be used to remove the off-flavors from steamed extract.

Table I shows some typical data for samples of steamed extract (140 psig, 13.5 minutes). These data were collected over a period of time in a continuous extraction system.

TABLE I

| Steamed Exact | | |
|---|---|---|
| Solubles Concentration | pH | Titratable Acidity |
| 18.7 | 4.58 | 6.75 |
| 21.7 | 4.35 | 7.15 |
| 21.6 | 4.63 | 6.60 |
| 15.3 | 4.38 | 7.47 |
| 22.6 | 4.53 | 7.31 |
| 19.8 | 4.48 | 7.50 |
| 20.6 | 4.62 | 6.88 |
| Average: | | |
| 20.0 | 4.51 | 7.09 |

Table II shows the same type of data for a similar coffee blend which has not been steamed.

TABLE II

| Unsteamed Extract | | |
|---|---|---|
| Solubles Concentration | pH | Titratable Acidity |
| 15.1 | 5.02 | 4.35 |
| 20.8 | 4.72 | 5.35 |
| 13.0 | 4.67 | 5.19 |
| 19.9 | 4.78 | 5.80 |
| 16.8 | 5.00 | 4.13 |
| 19.1 | 4.75 | 4.93 |
| 20.9 | 4.76 | 4.95 |
| Average: | | |
| 17.9 | 4.81 | 4.96 |

Table III gives the same data for the combined extracts which have been filtered and the volatiles removed from the unsteamed extract. The mixture of steamed and unsteamed was approximately one to one.

TABLE III

| | Combined Extracts | |
| Solubles Concentration | pH | Titratable Acidity |
| --- | --- | --- |
| 19.2 | 4.61 | 5.90 |
| 16.3 | 4.68 | 6.34 |
| 19.5 | 4.65 | 6.03 |
| 17.9 | 4.76 | 5.88 |
| 18.2 | 4.68 | 6.25 |
| 17.9 | 4.65 | 6.58 |
| 19.0 | 4.72 | 5.85 |
| Average: | | |
| 18.3 | 4.68 | 6.12 |

The combined extract preferably has a pH of less than 4.7.

The combined coffee extract is decaffeinated, preferably via conventional liquid/liquid extraction processes. The decaffeination is preferably carried out with a water-immiscible organic solvent for caffeine. The water-immiscible organic solvents which can be used herein include organic halogen compounds such as methylene chloride, alcohols such as benzyl alcohol with or without diluent, as well as other solvents. Ethyl acetate is preferably used herein.

After the concentrated extract is decaffeinated, the water-immiscible organic solvent is separated from the coffee extract. The water-immiscible organic solvent is then further treated to remove the caffeine and to recover any coffee solubles which may be present in it. These solubles can be added back to the coffee extract.

The decaffeinated coffee extract is then stripped of the traces of organic solvent. This stripping may be done via steam, or by distillation. The combined coffee extracts can be concentrated by evaporation techniques to form a coffee concentrate of 35% to about 65% coffee solids.

The collected volatile condensate from the unsteamed coffee extract as well as any recovered coffee solubles from the decaffeination step are then added back to the concentrated decaffeinated coffee extract. This decaffeinated coffee extract is then dried by conventional means to produce a soluble beverage.

A brief description of a typical countercurrent coffee extraction system is included herein to illustrate the operation of this invention. The operation of such a system is well understood and many modifications and variations will be apparent to those skilled in the art from the description and example that follow.

A plurality of extraction columns filled with roast and ground coffee are connected in series by piping between the individual columns. Typically, six columns are found in the countercurrent extraction system, and therefore this description is given with reference to a six-column system. The last three columns, i.e. those containing the most spent coffee grounds, are referred to collectively as the hydrolysis columns, while the next two columns which contain coffee grounds of an intermediate degree of spentness are the extracting columns with the first column which contains the freshest coffee grounds being referred to as the fresh extraction column. As above noted, the extraction columns are intended to be used with roast and ground coffee; however, it should be realized that it can be adapted to the extraction of whole coffee beans.

The extraction liquid, which can be either water or a dilute aqueous coffee extract obtained from another source, enters the column containing the most nearly spent coffee grounds at the lower extremity of the column and is discharged at the top of the column. The outlet line from one column is directly connected to the inlet line of the next column. The extraction liquid progresses from column to column in the series generally entering each column at the bottom and being discharged from the top. Heat exchangers are fitted in the lines between the columns immediately prior to the extraction liquid inlet to the columns. The heat exchangers can be used when required to achieve or to maintain the hydrolysis temperature, i.e. about 320° F. to 380° F. in the hydrolysis columns of the extraction system. They can also be used in the extraction columns to cool or to heat the extraction liquid to any desired extracting temperature. Each column is fitted with a means for charging the column with roast and ground coffee, for discharging the coffee from the column, and for keeping the coffee in the column during the overall extraction cycle. The column which the extract liquor enters just prior to being withdrawn from the system contains the freshest coffee and is called the fresh extraction column. It is with respect to the type of coffee which is placed within the fresh extraction column that this invention is concerned. When the coffee is not treated to a steam column then the extract withdrawn from the extraction train is unsteamed extract. When this column has been filled with fresh roast and ground coffee and steamed as described herein, the extract is the "steamed extract."

When a one to one mixture of extracts is used, every other fresh column is steamed.

In most systems, an extra column is provided in each series so that the extraction operation is not interrupted while the most nearly spent coffee column is being emptied and refilled. The extra column is a standby column which is cut into the system either slightly before or simultaneously with the removal of the most nearly spent coffee column.

In the operation of the system, aqueous extract is drawn off at a reasonable draw-off ratio, usually of about 1.5 to 3.0. As is well known to those skilled in the art, the draw-off ratio is the amount of extract withdrawn from the fresh extraction column during one cycle compared to the average weight of coffee in the individual columns. Preferably, a draw-off ratio of 1.7 to 2.5 is employed.

After extract is drawn off from the fresh extraction column, a new column containing fresh roast and ground coffee is cut into the system with the original fresh extraction column becoming the next succeeding stage, and so on to the point where the column that originally contained the most nearly spent coffee, is removed from the system. The column removed from the system is cleared of the spent coffee grounds and charged with fresh roast and ground coffee to now become the standby fresh extraction column.

After emission from the extraction system, each extract is collected separately. The unsteamed extract is stripped of its volatiles by purging with an inert gas such as carbon dioxide, nitrogen, or steam. This sparging can be done at atmospheric or under reduced pressure.

The extracts are then combined and decaffeinated by liquid/liquid extraction. The decaffeinated extract is preferably concentrated to at least 45% concentration and preferably from 50% to 65% solubles concentration, and then dried by well known spray drying, freeze drying, or drum drying techniques.

The following example illustrates the process of this invention. Unless otherwise stated, all percentages are given on a weight basis.

A pilot plant extraction train consisting of 8 columns was utilized. The process was first operated sufficiently long to insure that a truly countercurrent progression of grounds and extract liquor existed before taking data and test extract drawoffs. This was accomplished by sequentially adding columns to the process until the total was 7 operating columns. As the extract drawoff began from the first column, i.e. the fresh extraction column, the last column, i.e. the column containing the most nearly spent coffee, was taken out of the process, emptied and refilled to be used again. This procedure is known in the art as startup.

A blend of 45% Arabicas and 55% Robustas is roasted to a photovolt color of 58. An average weight of 59.8 lbs. of the roasted and ground coffee is placed in each column. Each column is 7.5 ft. in length and 8 inches in diameter.

After startup the temperatures in the extraction train starting with the column containing the most spent coffee grounds and progressing to the fresh extraction column as measured at the inlet to each column and recorded at the beginning of the extract drawoff are as follows: 372° F., 330° F., 324° F., 310° F., 242° F., 191° F. and 177° F. The temperature of the extract being drawn off the fresh column is 177° F. The pressure at the fresh extraction column outlet is near atmospheric. The pressure of 150 psig is maintained on the other 6 columns. The drawoff ratio is 2.4 and the average cycle time is 32.5 minutes. The extract is cooled to 68° F. by passing the the fresh column extract through a chilled water heat exchanger. The fresh extraction column is exhausted through the chilled water heat exchanger to an open weigh tank. The percentage yield of solubles based on the roast and ground coffee is 43.1%.

Alternate fresh roast and ground extraction columns are steamed. The average time of steaming is about 13½ minutes, the average steam pressure is about 135–140 psig. The steaming is accomplished as follows. The column is filled with roast and ground coffee and the steam supply line to the column is opened. The column is steamed for 13½ minutes at 135–140 psig. At the end of the steaming time, the steam pressure is recorded and the steam supply line is closed. The fresh steamed column is vented. The steam and volatiles are neither condensed nor collected. The steam column is then brought on-line as a fresh extraction column. The drawoff extract is diverted to the steamed extract hold tank. When a 1:1 ratio of steamed or unsteamed extract is to be used, the next fresh extraction column added to the system is an unsteamed roast and ground coffee column. The unsteamed drawoff is passed to the "unsteamed" hold tank. Steamed and unsteamed columns are then alternated.

The unsteamed extract is devolatilized by passing steam (0.15 lb. of steam/lb. of extract) in a column maintained at a vacuum of 21 inches of Hg. The steam-stripped volatiles are condensed, and the condensate is stored at less than 50° F. for subsequent reincorporation into the coffee extract.

The stripped, i.e. devolatilized fresh coffee extract is mixed in a 1:1 proportion with the steamed coffee extract. The combined extract is introduced as the dispersed phase into the top of a continuous countercurrent extractor (a rotary-disc contactor). The ethyl acetate to extract ratio entering the column ranges from about 1.4:1 to about 2:1. The extract and the ethyl acetate are passed countercurrently and are mixed by the rotating impeller. Caffeine-containing solvent exits at the top end of the column while decaffeinated extract exits at the bottom of the column.

The decaffeination solvent containing caffeine and coffee solids is evaporated to solids content of about 5% by weight. The concentrated solvent is then introduced as the dispersed phase into the top of a second continuous countercurrent extractor with water as the continuous phase. Water to solvent ratio of about 1.0 is used at a temperature of 120° F. The decaffeinated concentrated solvent stream containing the flavor and aroma constituents is withdrawn from the bottom of the extractor and added to the decaffeinated coffee extract. The resulting extract is then desolventized by steam-stripping in another column maintained at a vacuum of 21 inches Hg and using 0.1 lbs. steam/lbs. of extract. Residual solvent level in the decaffeinated coffee extract is reduced to less than 1 ppm on a solids basis.

The decaffeinated combined coffee extract is then concentrated to about 63% solubles by vacuum evaporation. The condensate of the steam-stripped volatiles from the fresh coffee extract is added to the combined decaffeinated coffee extract.

The extract is spray-dried to yield a 97% decaffeinated soluble coffee powder.

What is claimed is:

1. A process for forming a coffee extract comprising:
    (a) steaming roast and ground coffee at a pressure of from about 120 to about 170 psig for from about 5 to about 45 minutes;
    (b) extracting the steamed coffee to form a coffee extract having a solids concentration of about 12% to about 25% and having a pH of less than 4.6.
    (c) stripping the volatiles from the coffee extract; and
    (d) combining the coffee extract from step (c) with unsteamed coffee extract, the combined extract having a pH of less than 4.7.

2. The process according to claim 1 wherein the stripping step involves concentrating of the coffee extract to a solids content of from about 35% to about 65%.

3. The process according to claim 2 wherein the coffee is steamed from about 10 to 15 minutes.

4. The process according to claim 3 wherein the coffee extract is produced by countercurrent extraction.

5. A process for producing a decaffeinated coffee concentrate comprising the steps of:
    (a) forming an extract from roast and ground coffee which has been steamed at a pressure of from about 120 psig to about 170 psig for from about 5 to about 45 minutes having a pH of less than 4.6 and having a solids concentration of about 12% to about 25%;
    (b) combining the extract from the steamed coffee with an extract from unsteamed coffee from which the volatiles have been removed, said combined extract having a pH of less than 4.7;
    (c) decaffeinating the combined extracts;
    (d) concentrating the decaffeinated coffee extract; and
    (e) adding back the volatiles removed from the unsteamed coffee extract.

6. The process according to claim 5 wherein the coffee concentrate is further dried to produce a soluble coffee product.

7. The process according to claim 6 wherein the decaffeination is carried out via a liquid/liquid decaffeination.

8. The process according to claim 7 wherein the decaffeination solvent is ethyl acetate.

9. The process according to claim 7 wherein the decaffeination solvent is methylene chloride.

10. The process according to claim 8 wherein the steamed coffee extract is produced from coffee which has been steamed at from about 130 to 150 psig for from about 10 to about 15 minutes.

11. A process according to claim 10 wherein said coffee extract is produced by countercurrent extraction.

* * * * *